Figure 1:
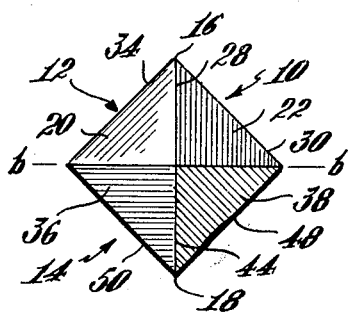

May 18, 1965

E. FRANKL 3,183,622

NOVELTY FOLDING DEVICE

Filed Nov. 2, 1962

3 Sheets-Sheet 1

INVENTOR.
Ernest Frankl
BY
Roberts, Cushman & Grover
ATT'YS

May 18, 1965 E. FRANKL 3,183,622
NOVELTY FOLDING DEVICE
Filed Nov. 2, 1962 3 Sheets-Sheet 2

May 18, 1965  E. FRANKL  3,183,622
NOVELTY FOLDING DEVICE
Filed Nov. 2, 1962  3 Sheets-Sheet 3

United States Patent Office 3,183,622
Patented May 18, 1965

3,183,622
NOVELTY FOLDING DEVICE
Ernest Frankl, Middleboro, Mass., assignor to Winthrop-Atkins Co., Inc., Middleboro, Mass., a corporation of Massachusetts
Filed Nov. 2, 1962, Ser. No. 235,044
21 Claims. (Cl. 46—154)

This invention relates to a novelty structure and has for its principal objects to provide an automatically expandable structure which, when released from constraint, will assume its expanded shape abruptly, thus providing a pop-up display device for advertising purposes; to provide an automatically expandable structure which may be held constrained within an envelope but which, when removed, will assume its expanded shape abruptly, thus providing a pop-up greeting card or the like; to provide an elastically expanded structure which may be employed, for example, as a Christmas decoration when fully expanded and, after use, may be collapsed for storage in a flat condition; to provide an elastically expanded structure which may be employed as a toy, having parts which, when expanded, are manipulatable by pressure to effect relative movement thereof, which parts may be embellished to resemble the faces of animals, persons and/or caricatures thereof; and to provide an elastically expanded structure which, when expanded, can be used as a container having a bottom and top, the latter being displaceable to provide access to the bottom. Other objects are to provide a structure designed to be made from strip material in a single die-cutting operation, which is easy to assemble and which is durable.

The structure comprises a pair of hollow pyramids having hinged side faces and open bases, mounted base-to-base with their apices at opposite sides of the plane of the bases, with the base edge of two adjacent side faces of one pyramid hinged to the corresponding base edges of the two adjacent faces of the other pyramid, with the base edges of the other two adjacent side faces of the one pyramid unconnected to the corresponding base edges of the other two side faces of the other pyramid, and an elastic element secured under tension interiorly of the structure between the two pyramids operating to hold the unconnected base edges normally engaged. The unconnected edges are adapted to be separated by pressure applied to the structure to decrease the dihedral angle between the two adjacent connected side faces of either of the pyramids. The adjacent connected side faces may contain openings for the fingers to afford means for gripping the side faces, to apply pressure in a direction to effect movement of the unconnected edges of the side faces of the pyramids relative to each other. The side faces, having the unconnected edges, are adapted to be embellished to resemble the jaws of an animal and/or person and to be manipulated by application and release of pressure to open and close the jaws. Application of pressure may be applied to raise the top from the bottom to permit access thereto or to completely collapse the pyramids so that the adjacent joined and unjoined side faces of each pyramid are disposed in parallel planes.

Figure 2:
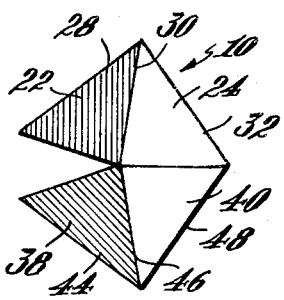
Figure 3:
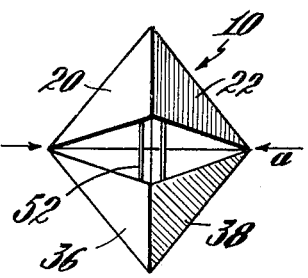
Figure 4:
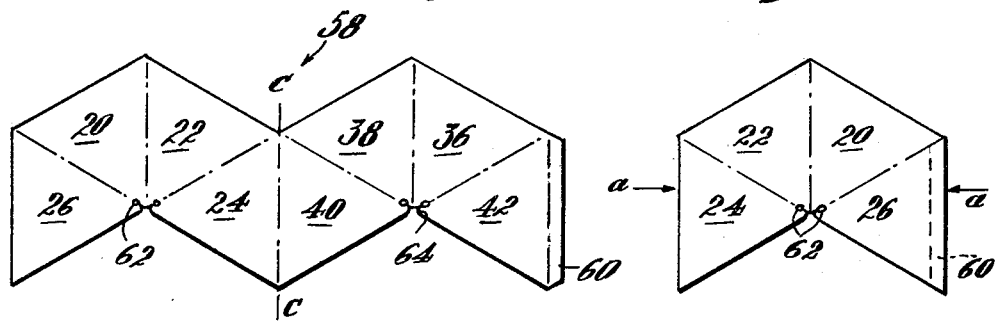
Figure 5:
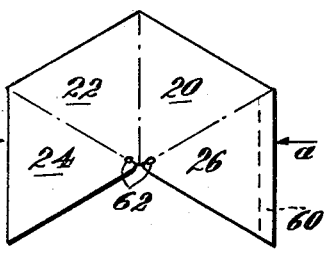
Figures 6, 7:
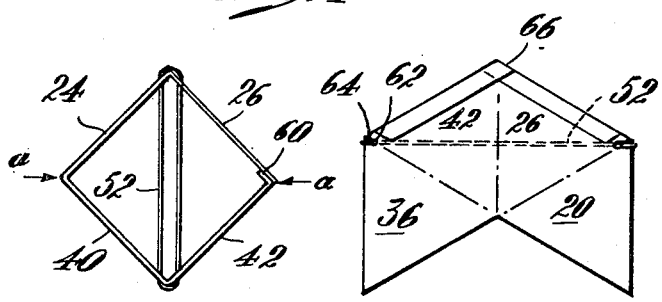
Figure 1A:
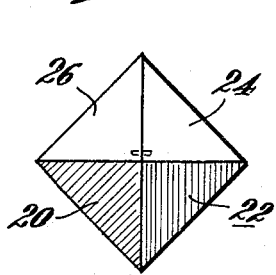
Figure 4A:
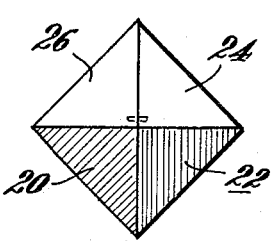
Figure 9:
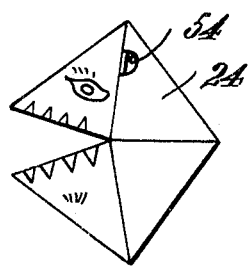
Figure 8:
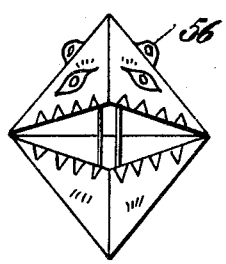
Figure 10:
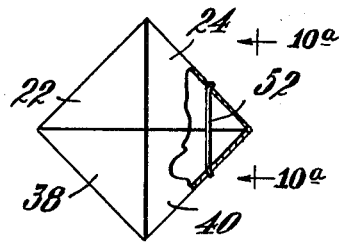
Figure 11:
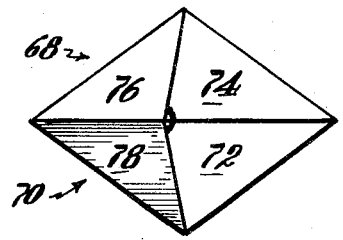
Figure 10A:
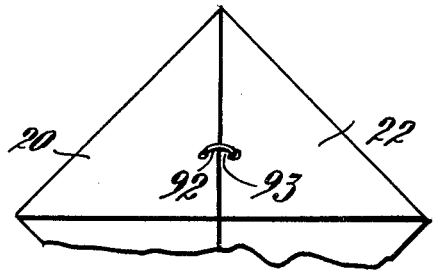
Figure 12:
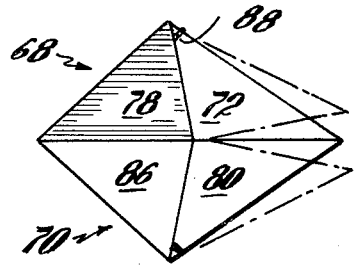
Figure 13:
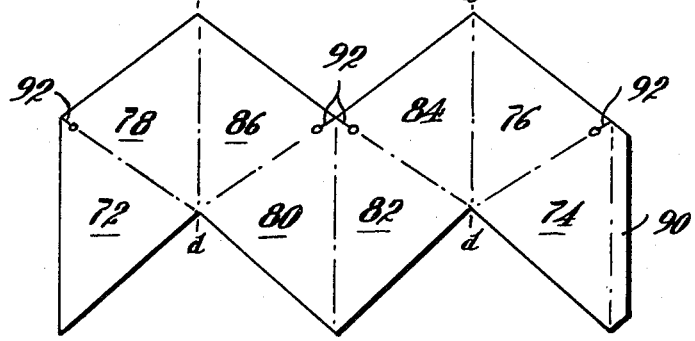
Figure 14:
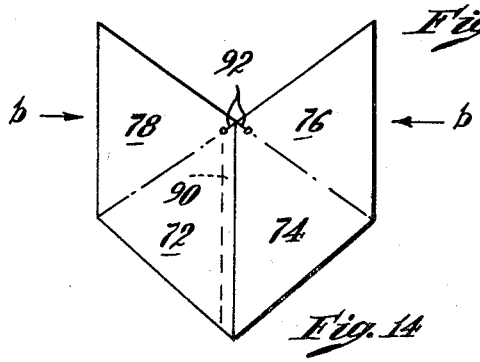
Figure 15:
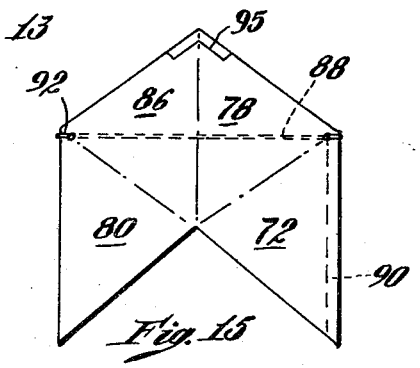
Figure 16:
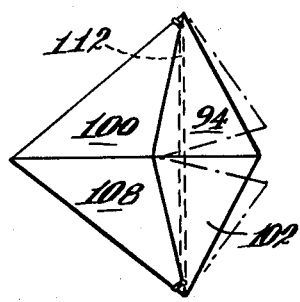
Figure 17:
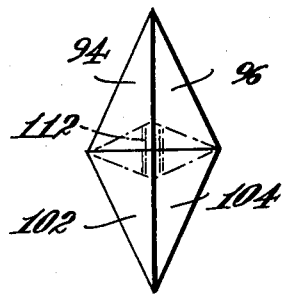
Figure 18:
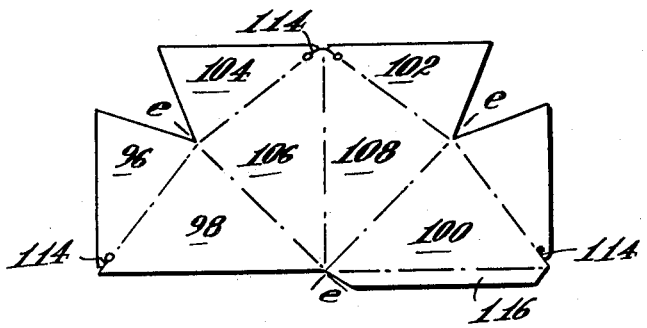
Figure 19:
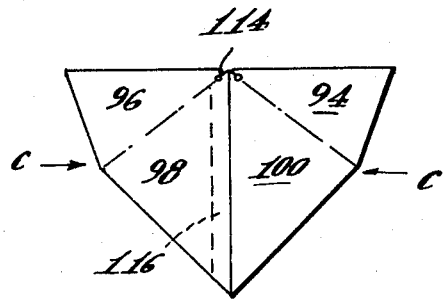
Figure 20:
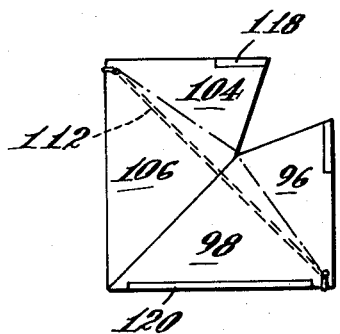

The invention will now be described in greater detail with reference to the accompanying drawings wherein:

FIG. 1 is a front elevation of the structure in its expanded form;
FIG. 1a is a top view of FIG. 1;
FIG. 2 is a side elevation of the structure with the portions forward of the transverse median separated;
FIG. 3 is a front elevation of the structure with the portions forward of the transverse median separated;
FIG. 4 is a plan view of the blank of which the structure is made;
FIG. 4a is an enlarged fragmentary view showing the means for securing the ends of the elastic band;
FIG. 5 is a plan view of the blank as initially folded preparatory to inserting the elastic band;
FIG. 6 is an elevation of the initially folded blank shown partially refolded to tension the elastic band;
FIG. 7 is a plan view of the refolded blank with the elastic band under tension and the endges converging at the exterior angle joined;
FIG. 8 is a front elevation corresponding to FIG. 3, embellished with a face applied to the upper and lower separable parts and with cut-outs forming ears;
FIG. 9 is a side elevation of FIG. 8;
FIG. 10 is an elevation of the structure broken away to show dispostion of the elastic element rearwardly of the apices of the pyramids;
FIG. 10a is a fragmentary elevation taken on the line 10a—10a of FIG. 10;
FIG. 11 is a plan view of a first modification of the structure wherein the two forward faces of each of the pyramids are larger than the two rearward faces, thus providing protruding jaws;
FIG. 12 is a side elevation of FIG. 11 showing the forepart faces of the pyramids in their closed and open positions;
FIG. 13 is a plan view of the starting blank for making the structure shown in FIGS. 11 and 12;
FIG. 14 is a plan view of the first step in folding the starting blank of FIG. 13;
FIG. 15 is a plan view of the final step of folding the blank and securing it;
FIG. 16 is an elevation of a second modification of the structure wherein the two forepart faces of each pyramid are smaller than the two rearward faces, thus providing receding jaws;
FIG. 17 is a front elevation of the structure as shown in FIG. 16, showing the forepart faces of the pyramids in closed and open positions;
FIG. 18 is a plan view of the starting blank for making the structure shown in FIGS. 16 and 17;
FIG. 19 is a plan view of the first step in folding the blank of FIG. 18; and
FIG. 20 is a plan view of the final step of folding the blank and securing it.

Referring to FIGS. 1 to 4 inclusive, the structure 10 is a hollow multi-sided body comprised of two quadrilateral pyramids 12 and 14 placed base-to-base as shown in FIG. 1, with their apices 16 and 18 at opposite sides of the plane of their bases. The pyramid 12 has four side faces 20, 22, 24 and 26 connected by hinges 28, 30, 32 and 34. The pyramid 14 has side faces 36, 38, 40 and 42 connected by hinges 44, 46, 48 and 50. The base edges of side faces 24 and 26 are connected, respectively, to the base edges of the side faces 40 and 42. The base edges of the side faces 20 and 22 are unconnected to the base edges of the side faces 36 and 38.

A tension element in the form of an elastic band 52 is connected under tension at its ends interiorly of the structure to the apices of the pyramids 12 and 14, and operates to hold the unconnected edges in abutting engagement with each other so that the structure is normally held closed. By an application of pressure in the direction of the arrows a—a (FIG. 3) to the apices at the opposite ends of the transverse median b—b of the structure, or to any corresponding parts of the side faces 24, 26 or 40, 42, the side faces forward of the transverse median b—b may be caused to separate a greater or lesser amount depending upon the pressure applied and, if sufficient pressure is applied, to completely collapse the structure so that the side faces 22 and 24 and the side faces 38 and 40 are disposed in parallel relation to the side faces 20, 26 and 36, 42 respectively. Release of the pressure results in an abrupt re-expansion of the structure to its initial position.

As thus constructed, the side faces of the structure may be suitably embellished with advertising media so as to constitute a pop-up display device for advertising purposes. Alternatively, the device may be printed in the form of a greeting card which can be held collapsed while in an envelope for transmittal and when removed from the envelope will pop-up, thus exciting the interest of the recipient. In its full expanded condition the structure, which is of light-weight material, may be embellished to provide a Christmas tree decoration, having the advantage that it may be collapsed so that it can be stored away flat and hence in a minimum of space.

As a novelty toy, the side faces, which are separable, may be embellished to simulate the face of an animal, person, or fanciful character as shown in FIGS. 8 and 9, so that, by manipulation of the upper and lower separable parts, the jaws may be opened and closed different amounts to simulate different facial expressions or to give the appearance of talking. To facilitate manipulation and to further simulate the appearance of the face, tabs may be cut out of the side faces such as 24, 26 to provide finger openings 54 by means of which a firmer grip may be secured on the side faces and simultaneously to provide laterally projecting ears 56. It is within the scope of the invention to embellish any one or more of the sides of the pyramid by providing openings therein, projections thereon cut out and folded from the sides, or attached thereto in order to simulate and/or create puppet-like characters.

Since the structure is hollow the lower half can be used as a container for novelty candies and the like, access to which may be had by raising the upper half.

The structure is made from a blank 58 (FIG. 4) cut from sheet material, for example, by die-cutting operation and is divided medially into halves which are symmetrical with respect to the median line c—c, each half comprising first, second, third and fourth equilateral triangles 26, 20, 22, 24 and 40, 38, 36 and 42, identified with the reference characters corresponding to those in the completed structure. The base edges of the triangles 24 and 40 are connected to each other at the median c—c and the side edges of the triangles 22, 20, 26 and 38, 36, 42 are connected, respectively, to the edges of the first, second and third triangles 24, 22, 20 and 40, 38, 36. A tab 60 is connected to the base edge of the endmost triangle 42.

The first step in forming the structure is to fold the blank 58 on the median c—c so as to bring the faces 24, 22, 20 and 26 into parallel relation with the side faces 40, 38, 36 and 42 and with the tab 60 folded between them. The halves are secured by means of adhesive applied to the tab or by stapling of the tab to the end of the opposite half.

The hinges connecting the side faces may be made by scoring or embossing during the die-cutting operation.

In cutting out the blank, holes 62 (FIG. 4) are punched in each half of the line joining the adjacent faces 26, 20, 22, 24 and 40, 38, 36, 42 of the respective halves, close to the common apices of the faces, and slots 64 are provided for access to the holes.

As will be seen by reference to FIG. 5, when the blank is folded the holes 62 in one half are directly in registration with the holes 62 in the other half. In this initially folded position the end portions of the elastic band 52 are inserted through the slots 64 into the holes 62. The initially folded blank is now refolded by applying pressure in the direction of the arrow a—a as shown in FIGS. 5 and 6, to stretch the elastic band 52 and to place the faces 36, 42, 26 and 20 in contact with the faces 38, 40, 24 and 22 respectively. In this position at least one pair of adjacent edges of the faces 42, 40 and 26 and 24, making the exterior angle, are hingedly joined. As shown, strips 66 of flexible material are adhesively secured to both pairs of adjacent edges. Any suitable hinge structure may be employed for joining portions or all of these edges. The structure is now completed and, when released, will resume the shape shown in FIG. 1 by contraction of the elastic band 52.

The elastic band, as shown in FIG. 6 is described as being connected at its ends to the apices of the pyramids, however, the ends of the band may be connected to the pyramids intermediate their apices and bases as shown, for example, in FIG. 10. The ends of the elastic band are secured in place by cutting arcuate slots 92 in the faces of the pyramids at their intersection (FIG. 10a), drawing the ends through the slots and looping them over the arcuate tabs 93 thus formed. Optionally, the elastic band may be similarly installed in the forepart of the device, that is, between the faces of the pyramids which are opened and closed by manipulation.

An important aspect of the invention which contributes materially to the practicability of manufacture resides in the design of the starting blank so that the elastic element can be installed in an unstretched condition while the blank is still in the first stage of folding and tensioned automatically as part of the final step of folding and securing. If the elastic element breaks the structure may be easily repaired by removing the adhesive strip or strips, returning the block to its initial stage of folding, applying a new elastic element while the blank is flat, refolding the blank to stretch the elastic element, and reapplying the adhesive strip or strips.

In the device as shown in FIGS. 1 to 10 inclusive, the pyramids have faces of equal size and are quadrilateral in shape. For the purpose of making puppets and the like, it is desirable to exaggerate the protrusion or recession of the forward faces of the pyramids, that is, the faces which form the jaw-like structure. To this end, a first modification is shown in FIGS. 11 and 12, in which the two pyramids 68 and 70, forming the upper and lower halves of the structure, have forward faces 72 and 74 of the upper pyramid, which are larger than the rearward faces 76 and 78, and forward faces 80 and 82 of the lower pyramid, which are larger than the rearward faces 84 and 86. In other respects, the pyramids are joined as described previously with respect to the structure shown in FIGS. 1 to 10 inclusive, with an elastic element 88 stretched between the apices of the pyramids or between points intermediate the apices and bases as described with reference to FIG. 10, so as to hold the base edges of the forward faces of the pyramids normally engaged but to permit them to be separated as shown by the dotted lines in FIG. 12, either to provide access to the interior of the structure or to manipulate the forward faces to initiate jaw-like movement.

The blank from which the structure shown in FIGS. 11 and 12 is made is shown in FIG. 13, with the respective component parts similarly identified. A fastening tab 90 is hinged at one end of the blank and provides means for securing the opposite ends together, forming the first folding step, as shown in FIG. 14. Initial folding on the lines d—d, d—d brings the slots 92, which are formed when the blank is die-cut, together as shown in FIG. 14 to receive the ends of the elastic band. The band is installed unstretched by drawing the ends into the slots whereupon the blank is refolded by applying pressure to the edges in the direction of the arrow b—b (FIG. 14) to take the shape shown in FIG. 15, thus tensioning the elastic band 88. As thus refolded, a flexible tape 95 is adhesively secured at the apex formed by the faces 76, 78, 84 and 86. As previously pointed out, however, the structure may be secured by applying the tape to a single pair of adjoining edges or to only a part of these edges.

FIGS. 16 and 17 illustrate a second modification of the structure in which the forepart faces 94, 96 of the upper pyramid are smaller than the rearward faces 98 and 100 and the forepart faces 102, 104 of the lower pyramid are smaller than the rearward faces 106 and 108. In other respects, the structure is like that described in FIGS. 1 to 10 inclusive, and is provided with an elastic element 112 stretched between the apices of the two pyramids or at a point intermediate the apices and bases so as to hold the base edges of the forepart faces of the two pyramids normally engaged but to permit them to be separate and/or manipulated to simulate movement of a pair of jaws.

The blank for making the structure as shown in FIGS. 16 and 17 is shown in FIG. 18 with the component part correspondingly labeled. The blank is first folded on lines e—e, e—e between the parts 98 and 106 and 100 and 108 so as to take the shape shown in FIG. 19 and to bring the slots 114 into registration. The initially folded blank is secured by attachment of a tab 116 at the edge of the face 100 with the corresponding edge of the face 98. The elastic element 112 is then inserted in the slots 114, whereupon the blank is refolded by applying pressure in the direction of the arrows c—c (FIG. 19) to take the shape shown in FIG. 20. In this position, a flexible tape or the like is adhesively applied to portions of the adjoining edges of the faces 102, 104, 94, 96 and 98, 100, thus completing the structure.

As previously stated, an important aspect of the invention resides in the designing of the blanks so that, during formation of the structures, the elastic elements may be installed in a limp or relaxed condition and will be automatically placed under tension as the blanks are formed up to their final shape and secured. As was also previously pointed out, the surfaces of the faces may be provided with cut-outs, appliques, and the like, to provide pleasing, decorative and/or desired effects.

It should be understood that the present disclosure is for the purpose of illustration only and that this invention includes all modifications and equivalents which fall within the scope of the appended claims.

I claim:

1. A structure comprising a pair of hollow pyramids having hinged side faces and open bases, situated base-to-base with their apices at opposite sides of the plane of the bases, said hollow pyramids collectively forming a receptacle, hinge means connecting the base edges of two of the adjacent faces of one pyramid to the corresponding base edges of two of the adjacent faces of the other pyramid, the base edges of the other two adjacent faces of the one pyramid being unconnected to the corresponding base edges of the other two adjacent faces of the other pyramid, and an elastic element secured under tension interiorly of the structure between the pyramids operating to hold the unconnected base edges normally engaged, said unconnected base edges being adapted to be separated by pressure applied to the structure to decrease the dihedral angle between two of the adjacent connected faces of either of the pyramids.

2. A structure according to claim 1, wherein the faces of the pyramids are comprised of stiff sheet material and the hinge means are formed by scoring and/or embossing.

3. A structure according to claim 1, wherein the elastic element is a rubber band, end portions of which emerge from the interior of the structure at the apices and embrace the exterior of two of the side faces of each pyramid at the apices.

4. A structure according to claim 1, further characterized in that adjacent joined and unjoined side faces of each pyramid may be disposed in parallel planes by application of pressure, but that said faces will resume their pyramidal configuration upon release due to the operation of the elastic element.

5. A structure according to claim 1, wherein the two unconnected faces of each pyramid are embellished to simulate the jaws of an animal or person, whereupon, when the unconnected faces are moved relative to each other, they imitate movement of the jaws.

6. A structure according to claim 1, wherein the adjacent connected faces of one of the pyramids contains openings for the fingers to afford means for gripping the side faces to apply pressure in a direction to manipulate the unconnected portions of the pyramids forward of the transverse median relative to each other.

7. A structure according to claim 1, wherein the ends of the elastic element are connected to the apices of the pyramids.

8. A structure according to claim 1, wherein the ends of the elastic element are connected to the pyramids intermediate their apices and bases at the intersection of pairs of adjacent faces.

9. A structure according to claim 1, wherein the ends of the elastic element are connected to the pyramids intermediate the apices and rearwardly of a line joining the apices.

10. A structure according to claim 1, wherein the ends of the elastic element are connected to the pyramids intermediate the apices and forwardly of a line joining the apices.

11. A structure according to claim 1, wherein the pyramids are quadrilateral.

12. A structure according to claim 1, wherein two of the faces of each pyramid, at one side of a line joining their apices, differ in size from the two faces at the other side of the line joining the apices.

13. A structure according to claim 1, wherein two of the faces of each pyramid, forwardly of a line joining their apices, are larger than the two faces of each pyramid rearwardly of the line joining the apices.

14. A structure according to claim 1, wherein two faces of each pyramid, forwardly of a line joining their apices, are smaller than the two faces rearwardly of the line joining the apices.

15. The method of making a pop-up structure, comprising, providing a two-ply blank with the plies face-to-face, each ply consisting of four triangular faces hinged along adjacent edges with their apices at a common point and with the bases of the two intermediate faces forming an exterior angle and the sides of the two end faces forming an interior angle, and with slots at the hinges between each of the adjacent end and intermediate faces, inserting the end portions of a limp elastic band through the slots, refolding the plies to dispose the intermediate and end faces of each ply in engagement with each other so that the intermediate faces now become the end faces and the end faces now become the intermediate faces thereby stretching the elastic band and while the band is stretched joining portions of the edges of the end faces.

16. The method of making a pop-up structure comprising, providing a two-ply blank with the plies face-to-face, each ply consisting of four triangular side faces hinged along adjacent edges with their apices at a common point and with the bases of the two intermediate triangles forming an exterior angle and the sides of the two end triangles forming an interior angle and with slots at the hinges between each of the adjacent end and intermediate triangles, inserting the end portions of a limp elastic band through the slots, refolding the plies to dispose the intermediate and end triangles of each ply in engagement with each other so that the intermediate triangles now become the end triangles and the end triangles the intermediate triangles, thereby tensioning the elastic band, and while the band is under tension joining portions of the edges of the last-named triangles.

17. A blank for making a pop-up structure comprising a sheet having ends and edges, a hinge dividing the sheet medially between its ends into halves which are symmetrical with respect to the hinge, each half comprising first, second, third and fourth triangles, the base edges of the first triangle of each half being connected by said hinge and the side edges of the second, third and fourth triangles being hingedly connected to the first, second and third triangles so that the side edges of the first and fourth triangles make an internal angle and the side edges of the second and third triangles make an external angle, and slots between the apices of each of the first and second and third and fourth triangles.

18. A blank according to claim 17, wherein a tab is hinged to the end edge of one half for attachment to the end edge of the other half when the halves are folded to provide a two-ply structure having spaced parallel end edges and deviating side edges which are symmetrical with respect to a mid-line between the ends, one of said side edges making an internal angle and the other an external angle.

19. A structure comprised of two flat plies disposed face to face, said plies being coextensive and of identical configuration, each ply comprising end and intermediate triangles connected edge-to-edge with their apices at a common point, with the bases of the end triangles in spaced parallel relation, with the bases of the intermediate triangles forming an exterior angle, and with the sides of the end triangles forming an interior angle, means connecting the end triangles of the two plies to each other along their bases and means connecting the intermediate triangles of the two plies along their bases forming obtuse angles.

20. A two-ply structure according to claim 19, wherein there is a slot between the apices of each of the end and intermediate triangles.

21. A blank for making a pop-up structure comprising a sheet having ends and edges, a hinge dividing the sheet medially into halves which are symmetrical with respect to said median, each half containing first, second, third and fourth triangular faces, the second triangular faces of the two halves being connected to each other along a hinge coinciding with the median of the blank, the third triangular face of each half being hingedly connected along an edge to an edge of the second triangular face so that two sides intersect at an obtuse angle, and the first and fourth triangular faces being hingedly connected respectively to the obtusely intersecting sides of the second and third triangular faces.

References Cited by the Examiner
UNITED STATES PATENTS

| | | | |
|---|---|---|---|
| 502,896 | 8/93 | Vine | 46—1 |
| 546,264 | 9/95 | Vine | 46—1 |
| 1,997,022 | 4/35 | Stalker | 46—1 |
| 2,601,374 | 6/52 | Ditzler et al. | 46—37 X |
| 2,633,657 | 4/53 | Warren | 46—1 X |
| 2,680,935 | 6/54 | Smart | 46—1 X |
| 2,819,559 | 1/58 | Daley | 46—1 X |
| 2,883,195 | 5/59 | Rogers et al. | 46—1 X |

FOREIGN PATENTS 588,842   6/47   Great Britain.

RICHARD C. PINKHAM, *Primary Examiner.*